(12) United States Patent
Yuanzhu

(10) Patent No.: US 8,358,237 B2
(45) Date of Patent: Jan. 22, 2013

(54) WIRELESS SENSOR APPARATUS

(75) Inventor: Dou Yuanzhu, Miyagi-Ken (JP)

(73) Assignee: Alps Electric Co., Ltd., Tokyo (JP)

( * ) Notice: Subject to any disclaimer, the term of this patent is extended or adjusted under 35 U.S.C. 154(b) by 273 days.

(21) Appl. No.: 12/907,570

(22) Filed: Oct. 19, 2010

(65) Prior Publication Data

US 2011/0095936 A1    Apr. 28, 2011

(30) Foreign Application Priority Data

Oct. 27, 2009   (JP) ................................. 2009-246584

(51) Int. Cl.
   *G01S 7/28*   (2006.01)
(52) U.S. Cl. ......................................... 342/28; 342/188
(58) Field of Classification Search ..................... 342/28, 342/188

See application file for complete search history.

(56) References Cited

U.S. PATENT DOCUMENTS

| | | | | |
|---|---|---|---|---|
| 4,544,926 A * | 10/1985 | Giuli | | 342/19 |
| 4,910,468 A * | 3/1990 | Ohtsuka et al. | | 329/316 |
| 5,710,799 A * | 1/1998 | Kobayashi | | 375/349 |
| 5,844,950 A * | 12/1998 | Aono et al. | | 375/346 |
| 7,982,586 B2 * | 7/2011 | Ovard et al. | | 340/10.4 |
| 2011/0057829 A1* | 3/2011 | Yuanzhu | | 342/28 |
| 2011/0095936 A1* | 4/2011 | Yuanzhu | | 342/27 |
| 2011/0095942 A1* | 4/2011 | Yuanzhu | | 342/188 |

FOREIGN PATENT DOCUMENTS

| | | |
|---|---|---|
| JP | 2004-245602 | 9/2004 |
| JP | 2006-255141 | 9/2006 |

\* cited by examiner

*Primary Examiner* — John B Sotomayor

(74) *Attorney, Agent, or Firm* — Hunton & Williams LLP

(57) ABSTRACT

A wireless sensor apparatus controls, in a case where wireless waves are radiated by feeding pulse signals generated by a signal generation circuit to antennas, an operation timing of the signal generation circuit and a path from the signal generation circuit to the antennas in such a manner that after a prior pulse signal is fed to the antenna and simultaneously supplied to a mixer circuit, at a proximate timing which does not overlap with a pulse width of the prior pulse signal supplied to the antenna and the mixer circuit, a next pulse signal is fed to the antenna and simultaneously supplied to a mixer circuit.

5 Claims, 4 Drawing Sheets

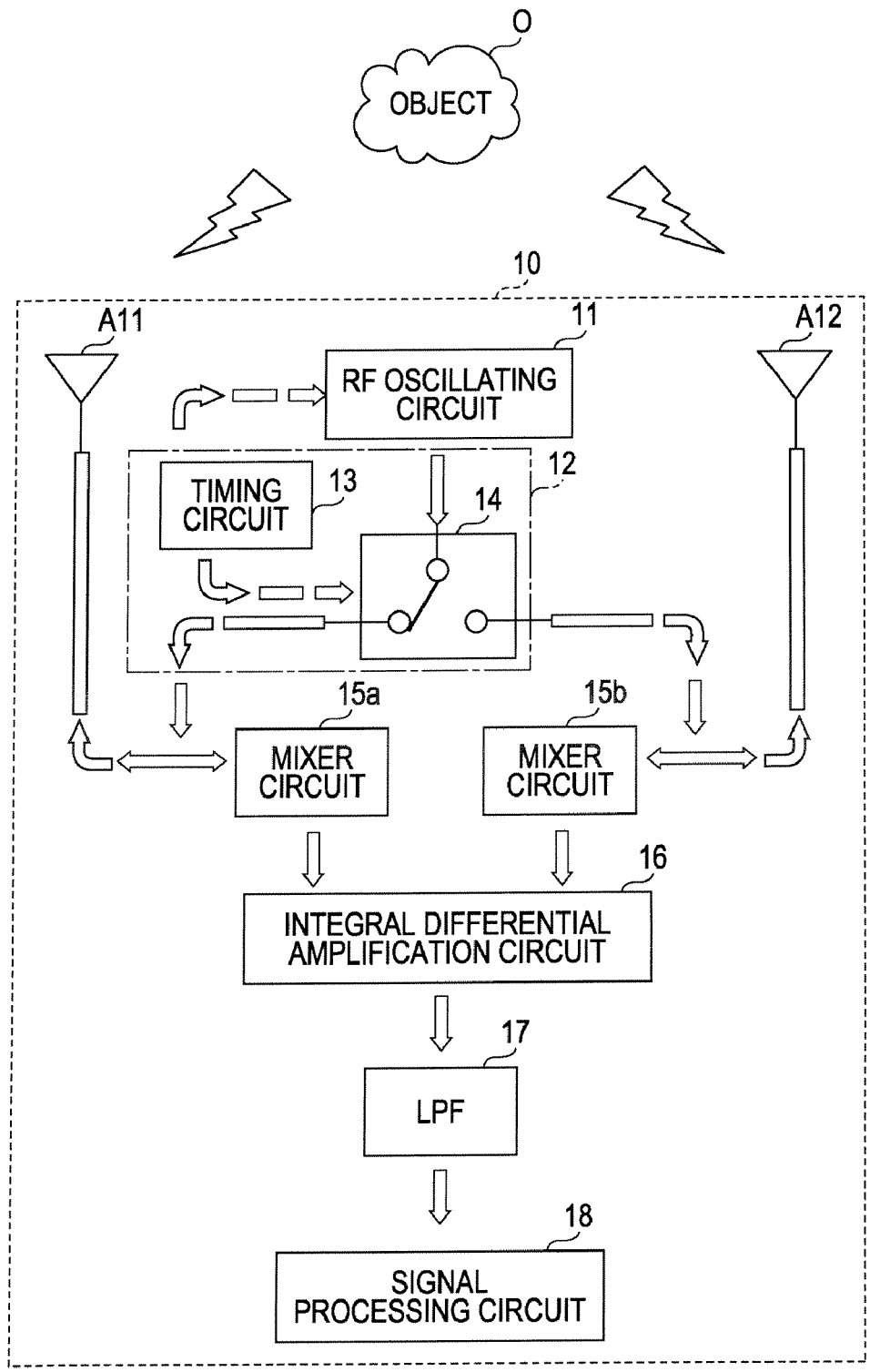

WIRELESS SENSOR APPARATUS

CLAIM OF PRIORITY

This application claims benefit of Japanese Patent Application No. 2009-246584 filed on Oct. 27, 2009, which is hereby incorporated by reference in its entirety.

BACKGROUND OF THE DISCLOSURE

1. Field of the Disclosure

Embodiments of the present disclosure relate to a wireless sensor apparatus for detecting a motion or the like of an object on the basis of a reflected wave of the object by using a wireless wave.

2. Description of the Related Art

Japanese Unexamined Patent Application Publication No. 2004-245602 discloses an apparatus which is configured to feed an output signal from an oscillator to an antenna for radiating a wireless wave, receive a reflected wave obtained while this wireless wave is reflected by an object, and detect an orientation and a motion of the object on the basis of the received reflected wave).

FIG. 4 shows a wireless sensor apparatus configured to detect a motion or the like of an object by using a pulse signal output from an oscillator. An wireless sensor apparatus 1 shown in FIG. 4 is provided with two transmission and reception antennas A1 and A2. Two pulse signals are output at a same timing from an RF oscillating circuit 2 to be fed to the transmission and reception antennas A1 and A2 and also sent to mixer circuits 3a and 3b as local signals. Wireless waves are radiated from the transmission and reception antennas A1 and A2 which are supplied with the pulse signals, and reflected waves which are reflected from an object O are respectively received by the transmission and reception antennas A1 and A2. The received reflected waves are input to the mixer circuits 3a and 3b as electric reception signals and mixed with a part of the pulse signals input from the RF oscillating circuit 2. Signals output from the mixer circuits 3a and 3b are input to an integral differential amplification circuit 4 for an integral differential amplification, and low frequency components (including a DC signal) are taken out in a low-pass filter (LPF) 5. The signals passing through the LPF 5 are converted into digital signals by an A/D converter which is not shown in the drawing and taken in into a signal processing circuit 6. In the signal processing circuit 6, the presence or absence of the motion of the object O is detected on the basis of the signal of the low frequency components output from the low-pass filter (LPF) 5.

However, in the wireless sensor apparatus 1 shown in FIG. 4, as the transmission and reception antennas A1 and A2 are supplied with the pulse signals at the same time from the RF oscillating circuit 2, a problem occurs in which the wireless waves radiated from the respective antennas A1 and A2 at the same time function as mutual disturbing waves for causing an interference. As in the wireless sensor apparatus 1 described above, in a case where the wireless waves are radiated from the two transmission antennas A1 and A2 at the same time in order to improve an antenna reception sensitivity, it is necessary to secure an isolation between the antennas which significantly affects the antenna reception sensitivity and a dynamic range. However, in a case where a distance between the antennas is increased to cancel the interference, the size of the apparatus becomes larger, and therefore a problem occurs in which it is difficult to satisfy both the antenna reception sensitivity and a miniaturization of the apparatus.

Also, in the wireless sensor apparatus 1, as the two antennas A1 and A2 are supplied with the pulse signals from the RF oscillating circuit 2 at the same time, the RF oscillating circuit 2 is demanded to have a large peak power.

These and other drawbacks exist.

SUMMARY OF THE DISCLOSURE

Embodiments of the present disclosure have been made in view of the above-mentioned problem and provide a wireless sensor apparatus capable of securing an isolation between antennas without an interference of mutual wireless waves between a plurality of antennas, realizing a miniaturization of the apparatus, and also reducing a peak power demanded for an oscillator by half.

A wireless sensor apparatus according to an embodiment includes: first and second antennas; a first mixer circuit which is connected to the first antenna and configured to input a first reception signal received by the first antenna; a second mixer circuit which is connected to the second antenna and configured to input a second reception signal received by the second antenna; a signal generation circuit for generating pulse signals to be fed to the first and second antennas and also supplied to the first and second mixer circuits; an integral differential amplification circuit for inputting a signal obtained by mixing the first reception signal with the pulse signal and output by the first mixer circuit and a signal obtained by mixing the second reception signal with the pulse signal and output by the second mixer circuit; and a control unit for controlling, in a case where wireless waves are radiated by feeding the pulse signals to the first and second antennas, an operation timing of the signal generation circuit and a path from the signal generation circuit to the first and second antennas in such a manner that after a prior pulse signal is fed to the first antenna and simultaneously supplied to the first mixer circuit, at a proximate timing which does not overlap with a pulse width of the prior pulse signal supplied to the first antenna and the first mixer circuit, a next pulse signal is fed to the second antenna and simultaneously supplied to the second mixer circuit.

According to this configuration, after the prior pulse signal is fed to the first antenna and simultaneously supplied to the first mixer circuit, at a proximate timing which does not overlap with the pulse width of the prior pulse signal supplied to the first antenna and the first mixer circuit, the next pulse signal is fed to the second antenna and simultaneously supplied to the second mixer circuit. Therefore, the supply timing for the pulse signal to the first antenna is not overlapped with the supply timing for the pulse signal to the second transmission antenna. Therefore, it is possible to secure the isolation between the antennas without the interference caused by the mutual wireless waves between the plurality of antennas A11 and A12, and also it is possible to realize the miniaturization of the apparatus as the distance between the antennas does not need to be increased. Also, the pulse signals are fed from the signal generation circuit to the first and second antennas at different timings, and therefore as compared with the wireless sensor apparatus in related art, it is possible to reduce the peak power demanded for the oscillator by half.

In the above-mentioned wireless sensor apparatus, the control unit includes: a timing circuit for setting a generation timing for the pulse signals; and a switching element for switching an antenna which becomes a feed destination of the pulse signal output from the signal generation circuit between the first antenna and the second antenna, and the control unit controls the switching element in synchronization with the generation timing set in the timing circuit.

According to this configuration, as the antenna which becomes the feed destination of the pulse signal is switched between the first and second antennas in synchronization with the generation timing for the pulse signal set in the timing circuit, the supply timings for the pulse signals to the respective antennas can be switched. For that reason, the radiation timings for the wireless waves from the respective antennas are not overlapped with each other, and it is possible to prevent the interference of the wireless waves radiated from the respective antennas.

In the above-mentioned wireless sensor apparatus, the control means operates while the proximate timing which does not overlap with the pulse width of the prior pulse signal is a timing when a time twice the pulse width elapses from a rise of the prior pulse signal.

According to this configuration, as the proximate timing is the timing when the time twice the pulse width elapses from the rise of the prior pulse signal, when both the pulse signals are repeatedly generated, it is possible to continuously radiate the wireless waves from the respective antennas. Therefore, by analyzing the reflected waves continuously reflected, it is possible to detect the motion of the object moving at a high speed.

In the above-mentioned wireless sensor apparatus, the first and second antennas can also commonly use a transmission antenna and a reception antenna. Also, the first and second antennas can adopt a configuration in which an antenna for radiating a wireless wave by being fed with the pulse signal and an antenna for receiving a reflected wave which is reflected by an object and outputting the first or second reception signal are respectively separately provided.

BRIEF DESCRIPTION OF THE DRAWINGS

FIG. 1 is a functional block diagram of a wireless sensor apparatus according to an embodiment of the present disclosure;

DETAILED DESCRIPTION OF THE DISCLOSURE

Figure 2A:
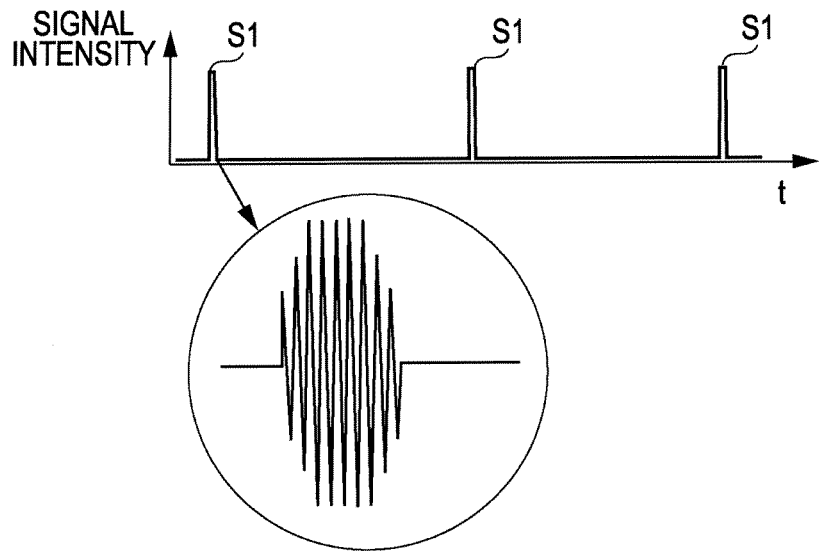
FIGS. 2A, 2B and 2C show a relationship between a transmission signal and a reception signal transmitted and received by transmission and reception antennas of the wireless sensor apparatus according to the present disclosure.

The following description is intended to convey a thorough understanding of the embodiments described by providing a number of specific embodiments and details involving a wireless sensor apparatus. It should be appreciated, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending on specific design and other needs.

Hereinafter, with reference to the accompanying drawings, various embodiments of the present disclosure will be described in detail. A wireless sensor apparatus according to an embodiment is provided with a plurality of antennas for transmission and reception and may be configured to feed pulse signals generated by an RF oscillating circuit to the respective antennas for radiating wireless waves and detect a motion or the like of an object on the basis of a reflected wave obtained while this wireless wave is reflected by the object.

FIG. 1 is a functional block diagram of the wireless sensor apparatus according to an embodiment of the disclosure. As shown in FIG. 1, a wireless sensor apparatus 10 may include two transmission and reception antennas A11 and A12, an RF oscillating circuit 11 configured to generate pulse signals to be supplied to the transmission and reception antennas A11 and A12, and a control unit 12 for controlling the generation timing for the pulse signals of the RF oscillating circuit 11. In a wireless sensor apparatus 10 according to the present disclosure, the generation timings may be controlled so that pulse widths (radiation timings) of the pulse signals supplied to the respective transmission and reception antennas A11 and A12 are not overlapped, and the respective transmission and reception antennas A11 and A12 receiving the pulse signals at different generation timings are configured to radiate the wireless waves. It should be noted that in the following description, the pulse signal supplied to the transmission and reception antenna A11 is described as a first pulse signal and the pulse signal supplied to the transmission and reception antenna A12 is described as a second pulse signal, but for simplifying the description, unless specifically distinguished otherwise, the signals are referred simply as pulse signals.

The RF oscillating circuit 11 may generate the first and second pulse signals having a predetermined pulse width Pw while following the generation timing control for the pulse signals by the control unit 12. The respective pulse signals thus generated may be sent to a switching element 14. Herein, for the pulse signal, for example, a rectangular wave-like or triangular wave-like signal can be applied if the signal has a width overlapping the reflected wave from the object O (delayed wave).

The control unit 12 may control the generation timing for the pulse signals of the RF oscillating circuit 11 and a path from the RF oscillating circuit 11 to the transmission and reception antennas A11 and A12 so that the pulse widths of the first and second pulse signals fed to the transmission and reception antennas A11 and A12 are not overlapped with each other. The control unit 12 may be composed of a timing circuit 13 and the switching element 14. In the timing circuit 13, a generation timing for the pulse signal may be set so that the rise of the second pulse signal appears at a time point when a time elapses by 2 pulse widths from the rise of the first pulse signal. It should be noted that in a case of a proximate timing where the pulse widths of the first and second pulse signals are not overlapped with each other, an interval between the first pulse signal and the second pulse signal is not limited to a case where the rise of the second pulse signal appears at a time point when a time elapses by 2 pulse widths from the rise of the first pulse signal. That is, this setting on the generation timing for the pulse signals can be changed to a timing if the pulse widths of the first and second pulse signals are not overlapped with each other in accordance with the motion or the like of the object O.

The timing circuit 13 may send a control signal instructing this generation timing for the pulse signal to the RF oscillating circuit 11 and also a switching signal in synchronization with this control signal to the switching element 14. While following the switching signal received from the timing circuit 13, the switching element 14 may switch the supply destination of the pulse signal supplied from the RF oscillating circuit 11 to the transmission and reception antenna A11 side or the transmission and reception antenna A12 side. In this manner, the pulse signal may be generated in the RF oscillating circuit 11 in response to the control signal from the timing circuit 13, and in synchronization with this, the switching element 14 may switch the supply destination of the pulse signal to the transmission and reception antenna A11 side or the transmission and reception antenna A12 side. As a result, in synchronization with the generation timing for the pulse signal set in the timing circuit 13, the antenna for radiating the pulse signal may be switched to the first or second transmission antennas A11 or A12. As the supply timings for the pulse signals to the respective transmission antennas A11 and A12 are switched, the radiation timings for the wireless waves from the respective transmission antennas A11 and A12 are not overlapped with each other, and the interference of the wireless waves radiated from the respective transmission antennas A11 and A12 can be prevented.

Figure 2B:
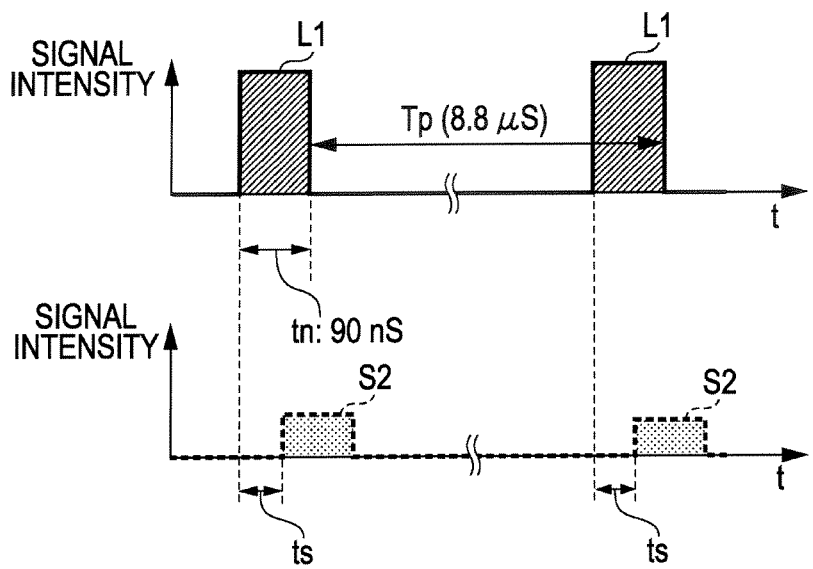
Figure 2C:
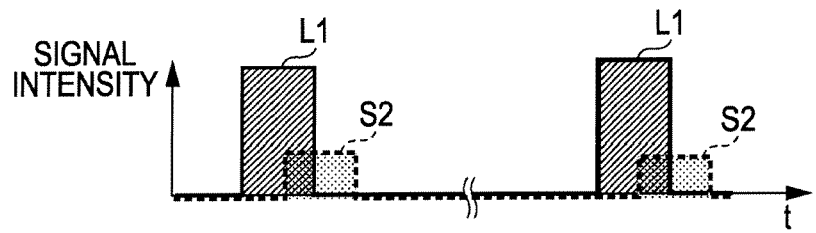

Referring to FIGS. 2A, 2B and 2C, the transmission signal and the reception signal transmitted and received by the transmission and reception antenna A11 (A12) will be described. FIGS. 2A, 2B and 2C show a relation between the transmission signal and the reception signal transmitted and received by the transmission and reception antenna A11 (A12). In FIGS. 2A, 2B and 2C, the vertical axis indicates a signal intensity, and the horizontal axis indicates a time t.

As shown in FIG. 2A, the pulse signal passing through the switching element 14 from the RF oscillating circuit 11 may be fed to the transmission and reception antenna A11 (A12) and radiated as a wireless wave (transmission signal S1). FIG. 2A shows the transmission signal S1 in a case where, for example, the pulse signal having a duty rate of about 1/100 is supplied. At this time, a part of the pulse signal fed to the transmission and reception antenna A11 (A12) may be sent to the mixer circuit 15a (15b) as a local signal L1 (FIG. 2B). Herein, a state is illustrated in which the local signal L1 having a predetermined pulse width tn from the RF oscillating circuit 11 (for example, 90 nS) is supplied at a predetermined interval Tp (for example, 8.8 μS). On the other hand, the reflected wave from the object O received by the transmission and reception antenna A11 (A12) may be subjected to a signal detection (envelope detection) to be sent as a reception signal S2 to the mixer circuit 15a (15b). The reception signal S2 may be input to the mixer circuit 15a (15b) with a delay by a predetermined time ts from the local signal L1. FIG. 2C shows the local signal L1 and the reception signal S2 input to the mixer circuit 15a (15b).

Figure 3A:
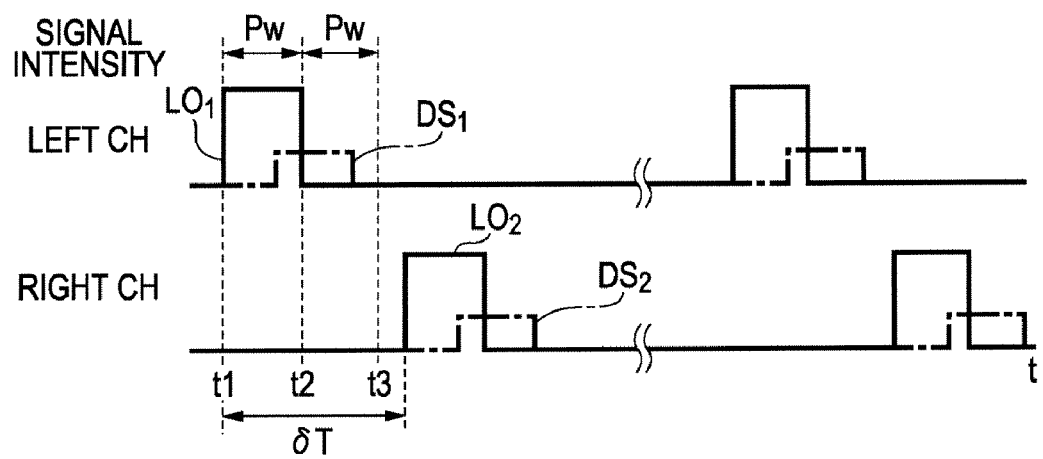
FIGS. 3A and 3B are explanatory diagrams for describing a generation timing control for pulse signals by a timing circuit according to the present disclosure.
Figure 3B:
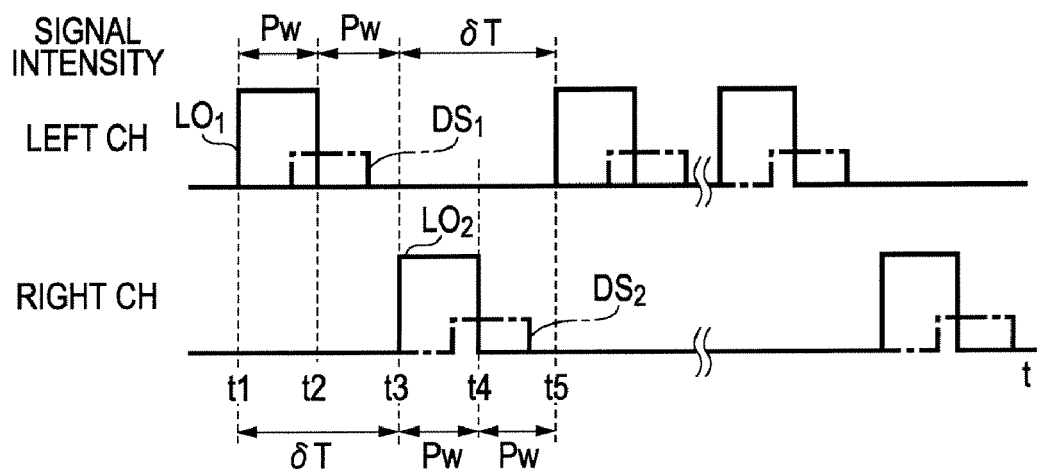
Figure 4:
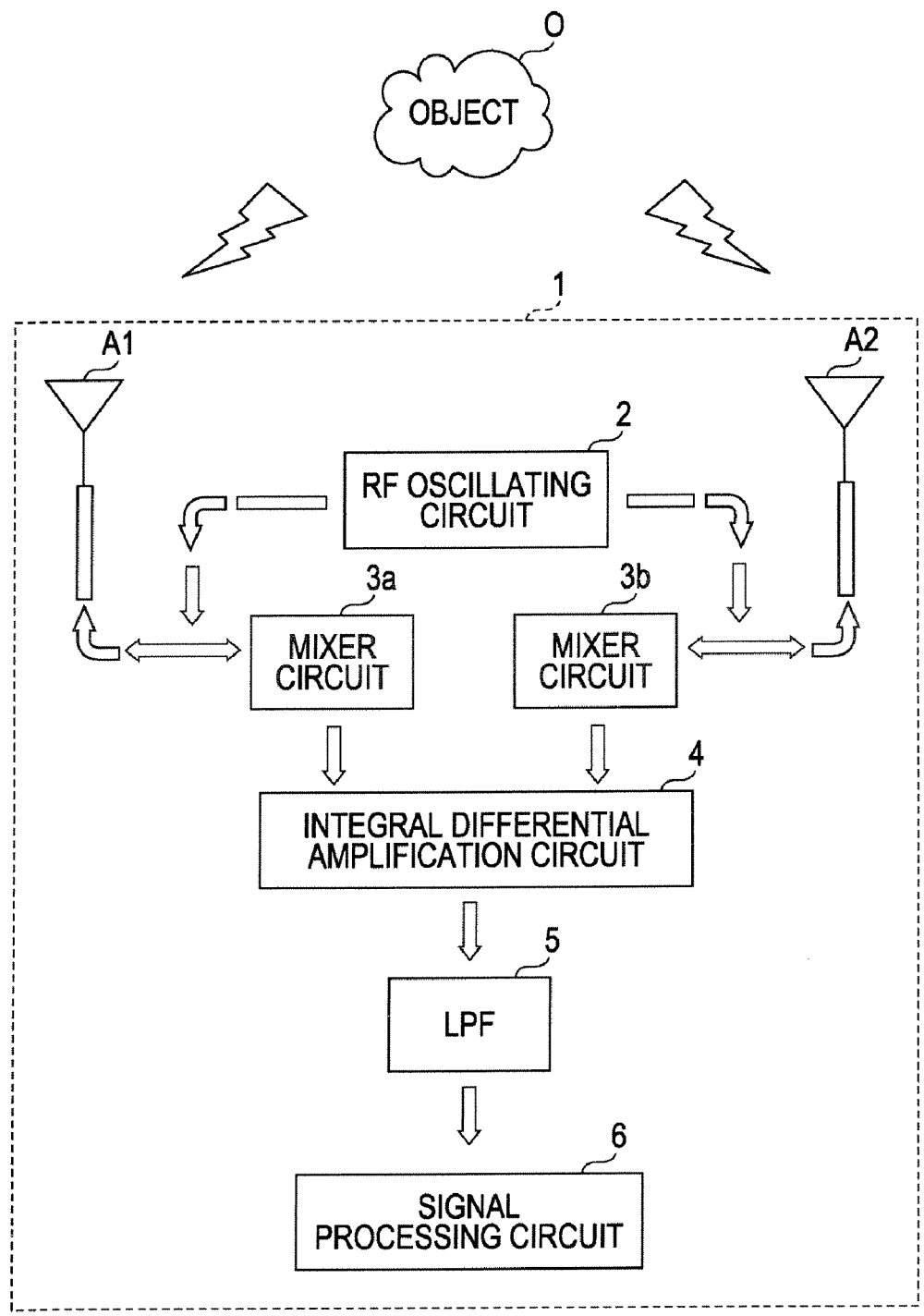
FIG. 4 shows a wireless sensor apparatus in related art.

Next, by using FIGS. 3A and 3B, the generation timing control for the pulse signals of the timing circuit 13 will be described. FIGS. 3A and 3B are explanatory diagrams for describing the generation timing control for the pulse signals of the timing circuit 13 according to the present embodiment. In FIGS. 3A and 3B, the vertical axis indicates a signal intensity, and the horizontal axis indicates a time t. It should be noted that in FIGS. 3A and 3B, a left channel is described as the first pulse signal (local signal $LO_1$) supplied to the transmission and reception antenna A11 (the mixer circuit 15a), and a right channel is described as the second pulse signal (local signal $LO_2$) supplied to the transmission and reception antenna A12 (the mixer circuit 15b). It should be noted that in FIGS. 3A and 3B, a signal DS represented by a dashed-dotted line indicates the reflected waves from the object O (first and second reception signals) received by the respective transmission and reception antennas A11 and A12.

As shown in FIG. 3A, in the timing circuit 13, a generation timing where the first pulse signal rises at a time t1 may be set. When the control signal instructing the generation timing t1 is sent to the RF oscillating circuit 11, the RF oscillating circuit 11 may generate the first pulse signal having the pulse width Pw. Also, in the timing circuit 13, a generation timing may be set so that the second pulse signal rises at a time t3 when a time elapses by 2 pulses from the time t1 for the rise of the first pulse signal. When the control signal instructing the generation timing t3 is sent to the RF oscillating circuit 11, the RF oscillating circuit 11 may generate the second pulse signal having the pulse width Pw. That is, in the timing circuit 13, the setting may be made in which the interval of the generation start timings for the pulse signals with respect to the two transmission and reception antennas A11 and A12 has a time gap of at least 2 pulse widths ($\delta T (\geq 2Pw)$).

Also, in a case where the object O moves at a high speed, the generation timing for the pulse signal of the timing circuit 13 may be set in accordance with the motion or the like of the object. In FIG. 3B, the generation timing for the pulse signal may be set so that the second pulse signal rises at a time (t3) when a time elapses by 2 pulse widths from at the time t1 for the rise of the first pulse signal. That is, in the timing circuit 13, the setting may be made in which the interval of the generation start timings for the pulse signals with respect to the two transmission and reception antennas A11 and A12 has a time gap of 2 pulse widths ($\delta T (=2Pw)$). As a result, the first pulse signal and the second pulse signal may be generated at a shorter interval, and when both the pulse signals are repeatedly generated to be supplied to the respective transmission and reception antennas A11 and A12, it may be possible to continuously radiate the wireless waves from the respective transmission and reception antennas A11 and A12. Then, when the reflected waves continuously reflected are analyzed, it may be possible to detect the motion of the object O moving at a high speed.

The wireless sensor apparatus 10 according to the present embodiment may be provided with two mixer circuits 15a and 15b, an integral differential amplification circuit 16, a low-pass filter (LPF) 17, and a signal processing circuit 18 as components on the reception side. To the mixer circuit 15a functioning as a first mixer circuit, via the switching element 14, a part of the first pulse signal (the local signal $LO_1$ shown in FIGS. 3A and 3B) supplied to the transmission and reception antenna A11 may be input as a local signal. Also, to the mixer circuit 15a, a first reception signal receiving the reflected wave from the object O from the transmission and reception antenna A11 on the reception side (delay signal $DS_1$ shown in FIGS. 3A and 3B) may be input. Similarly, to the mixer circuit 15b functioning as a second mixer circuit, via the switching element 14, a part of the second pulse signal (the local signal $LO_2$ shown in FIGS. 3A and 3B) from the transmission and reception antenna A12 may be input. Also, to the mixer circuit 15b, a second reception signal receiving the reflected wave from the object O from the transmission and reception antenna A12 on the reception side (delay signal $DS_2$ shown in FIGS. 3A and 3B) may be input. At this time, in the two mixer circuits 15a and 15b, if the motion of the object O exists, phase differences between the local signal and the reception signal may differ from each other, and mutually different low frequency signals may be output. On the other hand, if the motion of the object O does not exist, the same signals may be output from the two mixer circuits 15a and 15b. The signals respectively output from the mixer circuits 15a and 15b are input to the integral differential amplification circuit 16.

The respective signals input in the integral differential amplification circuit 16 from the mixer circuits 15a and 15b at the same timing may be subjected to the integral differential amplification, and low frequency components may be taken out by the LPF 17. The low frequency components passing through the LPF 17 may be input to the signal processing circuit 18 as digital signals by the A/D converter which is not shown in the drawings. In the case where the object O moves, by analyzing a phase difference and an amplitude difference between the transmission signal and the reception signal included in this low frequency signal, the motion or the like of the object O may be detected.

Next, an operation of the wireless sensor apparatus 10 will be described. Herein, a case will be described as an example in which the pulse signal is generated at a timing shown in FIG. 3A.

When a control signal for generating the first pulse signal is received from the timing circuit 13, at the time t1, the RF oscillating circuit 11 may generate the first pulse signal to be supplied to the transmission and reception antenna A11. In synchronization with the timing at which the control signal is sent from the timing circuit 13 to the RF oscillating circuit 11, the supply destination of the pulse signal may be switched to the transmission and reception antenna A11 side. The generated first pulse signal may be sent via the switching element 14 to the mixer circuit 15*a* at the same time as the transmission and reception antenna A11. The transmission and reception antenna A11 to which the first pulse signal is fed may radiate the wireless wave and also may receive the reflected wave obtained while the radiated wireless wave is reflected by the object O as the electric reception signal $DS_1$. At this time, as the wireless wave is not radiated from the other transmission and reception antenna A12, a disturbing wave from the transmission and reception antenna A12 may not exist. The reception signal $DS_1$ may be input to the mixer circuit 15*a*.

On the other hand, at the time t3, the RF oscillating circuit 11 receiving the control signal for generating the second pulse signal from the timing circuit 13 may generate the second pulse signal to be supplied to the transmission and reception antenna A12. In synchronization with the transmission timing for this control signal, the supply destination of the pulse signal may be switched to the transmission and reception antenna A12 side. The generated second pulse signal may be sent via the switching element 14 to the mixer circuit 15*b* as the same time as the transmission and reception antenna A12. The transmission and reception antenna A12 to which the second pulse signal is fed may radiate the wireless wave and also may receive the reflected wave obtained while the radiated wireless wave is reflected by the object O as the electric reception signal $DS_2$. At this time, as the wireless wave is not radiated from the other transmission and reception antenna A11, a disturbing wave from the transmission and reception antenna A11 does not exist. The reception signal $DS_2$ may be input to the mixer circuit 15*b*.

In the mixer circuit 15*a*, a part of the pulse signal $LO_1$ input from the RF oscillating circuit and the reception signal $DS_1$ may be mixed, and in the mixer circuit 15*b*, a part of the pulse signal $LO_2$ input from the RF oscillating circuit and the reception signal $DS_2$ may be mixed. The signal output from the mixer circuit 15*a* may be input to the integral differential amplification circuit 16 together with the signal output from the mixer circuit 15*b* at a timing which can be regarded as substantially the same timing. If the object O moves, the output of the mixer circuit 15*a* and the output of the mixer circuit 15*b* may vary from each other, and a difference thereof may be subjected to the integral differential amplification in the integral differential amplification circuit 16. Also, if the object O is in a halt state, the output of the mixer circuit 15*a* and the output of the mixer circuit 15*b* may become almost 0, and therefore the output of the integral differential amplification circuit 16 also may become almost 0. As to the output signal of the integral differential amplification circuit 16, the low frequency signal may be taken out by the LPF 17 to be input to the signal processing circuit 18. As the low frequency signal taken out by the LPF 17 includes information related to the motion or position of the object O, by analyzing this information, the motion or the like of the object O may be detected.

In this manner, according to the present embodiment, after the prior pulse signal is fed to the first antenna A11 and simultaneously supplied to the first mixer circuit 15*a*, at a proximate timing which does not overlap with the pulse width of the prior pulse signal supplied to the first antenna A11 and the first mixer circuit 15*a*, the next pulse signal may be fed to the second antenna A12 and simultaneously supplied to the second mixer circuit 15*b*. Therefore, the supply timing for the pulse signal to the first antenna A11 is not overlapped with the supply timing for the pulse signal to the second transmission antenna A12. Therefore, it is possible to secure the isolation between the antennas without the interference of the mutual wireless waves between the plurality of antennas A11 and A12, and also it is possible to realize the miniaturization of the apparatus as the distance between the antennas does not need to be increased. Also, the pulse signals are fed from the RF oscillating circuit 11 to the first and second antennas A11 and A12 at different timings, and therefore as compared with the wireless sensor apparatus in related art, it is possible to reduce the peak power demanded for the RF oscillating circuit 11 by half.

It should be noted that according to the above-mentioned embodiment, the example has been described in which one antenna doubles as the transmission antenna and the reception antenna (shared use), but the transmission antenna and the reception antenna may be composed of separate antennas. Also, by composing the transmission and reception antennas A11 and A12 of orthogonal polarized-wave antennas (for example, the transmission and reception antenna A11 is composed of a vertical polarized-wave antenna, and the transmission and reception antenna A12 is composed of a horizontal polarized-wave antenna), it is also possible to further suppress the interference between the antennas.

Also, according to the above-mentioned embodiment, the configuration is adopted in which the timing circuit 13 directly controls the generation timing for the pulse signals of the RF oscillating circuit 11, but the embodiment is not limited to this configuration. For example, a configuration may also be adopted in which the timing circuit 13 is provided in a latter stage of the RF oscillating circuit 11 to control the supply timings (output timings) of the pulse signals output from the RF oscillating circuit 11 to the respective antennas.

Also, the embodiment disclosed in the present application is an exemplification in every aspect and is not limited to this embodiment. The scope of the present invention is not indicated by only the description on the above-mentioned embodiment but is indicated by a scope of the claims and is intended to include all modifications having equivalent meanings to the claims and within the scope thereof.

The present invention is applicable to a wireless sensor apparatus configured to detect a motion or the like of an object on the basis of a reflected wave from the object by utilizing a wireless wave. Accordingly, the embodiments of the present inventions are not to be limited in scope by the specific embodiments described herein. Further, although some of the embodiments of the present invention have been described herein in the context of a particular implementation in a particular environment for a particular purpose, those of ordinary skill in the art should recognize that its usefulness is not limited thereto and that the embodiments of the present inventions can be beneficially implemented in any number of environments for any number of purposes. Accordingly, the claims set forth below should be construed in view of the full breadth and spirit of the embodiments of the present inventions as disclosed herein. While the foregoing description includes many details and specificities, it is to be understood that these have been included for purposes of explanation only, and are not to be interpreted as limitations of the invention. Many modifications to the embodiments described above can be made without departing from the spirit and scope of the invention.

What is claimed is:

1. A wireless sensor apparatus comprising:
   first and second antennas;
   a first mixer circuit which is connected to the first antenna and configured to input a first reception signal received by the first antenna;
   a second mixer circuit which is connected to the second antenna and configured to input a second reception signal received by the second antenna;
   a signal generation circuit for generating pulse signals to be fed to the first and second antennas and also supplied to the first and second mixer circuits;
   an integral differential amplification circuit for inputting a signal obtained by mixing the first reception signal with the pulse signal and output by the first mixer circuit and a signal obtained by mixing the second reception signal with the pulse signal and output by the second mixer circuit; and
   control means for controlling, in a case where wireless waves are radiated by feeding the pulse signals to the first and second antennas, an operation timing of the signal generation circuit and a path from the signal generation circuit to the first and second antennas in such a manner that after a prior pulse signal is fed to the first antenna and simultaneously supplied to the first mixer circuit, at a proximate timing which does not overlap with a pulse width of the prior pulse signal supplied to the first antenna and the first mixer circuit, a next pulse signal is fed to the second antenna and simultaneously supplied to the second mixer circuit.

2. The wireless sensor apparatus according to claim 1, wherein the control means includes:
   a timing circuit for setting a generation timing for the pulse signals; and
   a switching element for switching an antenna which becomes a feed destination of the pulse signal output from the signal generation circuit between the first antenna and the second antenna, and
   the control means controls the switching element in synchronization with the generation timing set in the timing circuit.

3. The wireless sensor apparatus according to claim 1, wherein the control means operates while the proximate timing which does not overlap with the pulse width of the prior pulse signal is a timing when a time twice the pulse width elapses from a rise of the prior pulse signal.

4. The wireless sensor apparatus according to claim 1, wherein the first and second antennas commonly use a transmission antenna and a reception antenna.

5. The wireless sensor apparatus according to claim 1, wherein the first and second antennas are respectively separately provided with an antenna for radiating a wireless wave by being fed with the pulse signal and an antenna for receiving a reflected wave which is reflected by an object and outputting the first or second reception signal.

* * * * *